United States Patent [19]
Smith

[11] 3,930,365
[45] Jan. 6, 1976

[54] FUEL CONTROL SYSTEM FOR GAS TURBINE ENGINE

[75] Inventor: Trevor Stanley Smith, Sutton Coldfield, England

[73] Assignee: Joseph Lucas (Industries) Limited, Birmingham, England

[22] Filed: July 18, 1974

[21] Appl. No.: 489,742

[30] Foreign Application Priority Data
July 18, 1974 United Kingdom............ 34135/74

[52] U.S. Cl............................ 60/39.14; 60/39.28 R
[51] Int. Cl.² ........................................ F02C 7/26
[58] Field of Search............ 60/39.28 R, 39.14, 243, 60/39.28 T

[56] References Cited
UNITED STATES PATENTS

| | | | |
|---|---|---|---|
| 3,173,468 | 3/1965 | McCombs | 60/39.28 R |
| 3,427,804 | 2/1969 | Lawrence | 60/39.28 R |
| 3,514,947 | 6/1970 | Bloom | 60/39.28 R |
| 3,530,666 | 9/1970 | Cross | 60/39.28 R |
| 3,557,552 | 1/1971 | Yates | 60/39.28 R |
| 3,768,249 | 10/1973 | Lewis | 60/39.28 R |

Primary Examiner—Clarence R. Gordon
Attorney, Agent, or Firm—Holman & Stern

[57] ABSTRACT

A fuel control system for a gas turbine engine includes a metering device having a sleeve which is movable to vary fuel flow to the engine. A stop cooperates with the sleeve to define a minimum fuel flow. The stop is movable between a first, normal running position and a second, engine starting position, the second position corresponding to a smaller minimum flow through the metering arrangement.

4 Claims, 3 Drawing Figures

FUEL CONTROL SYSTEM FOR GAS TURBINE ENGINE

This invention relates to fuel control systems for gas turbine engines.

According to the invention a fuel control system for a gas turbine engine comprises a variable metering arrangement responsive to engine operating parameters to control fuel flow to the engine, a stop engageable by a part of said metering arrangement to limit movement thereof in a direction to reduce fuel flow, and means responsive to a selector device associated with the engine to set said stop in a first position for normal running of the engine and in a second position for engine starting, said second position corresponding to a smaller minimum flow through said metering arrangement.

In a preferred embodiment the said means responsive to the selector device comprises a cam co-acting with said stop and movable to urge the latter to said first and second positions.

In a further preferred embodiment said variable metering arrangement includes a sleeve movable in response to an increase in the delivery pressure of a compressor of the engine to increase fuel flow, and said stop co-acts with said sleeve to limit movement thereof.

In a further preferred embodiment the system includes a shut-off valve downstream of said metering arrangement, said selector device being operable in one of its positions to shut said shut-off valve, and in two others of its positions to move said stop to its first and second positions respectively.

Figure 1:
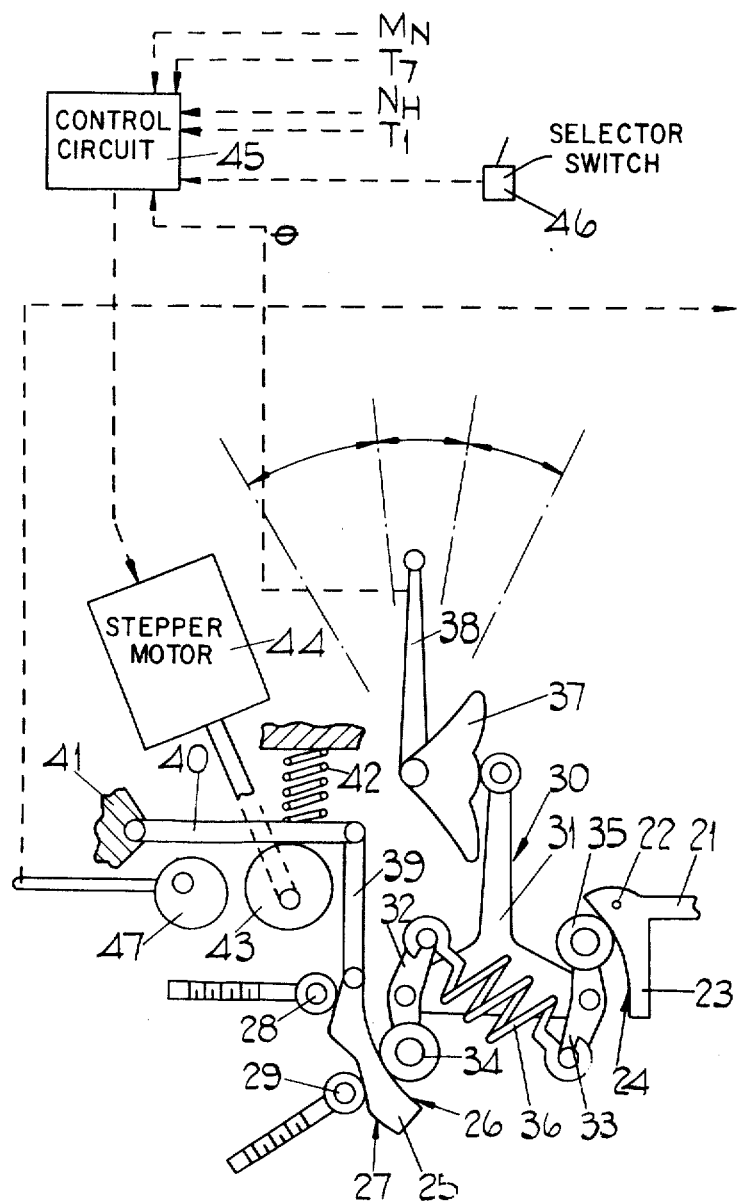
Figure 2:
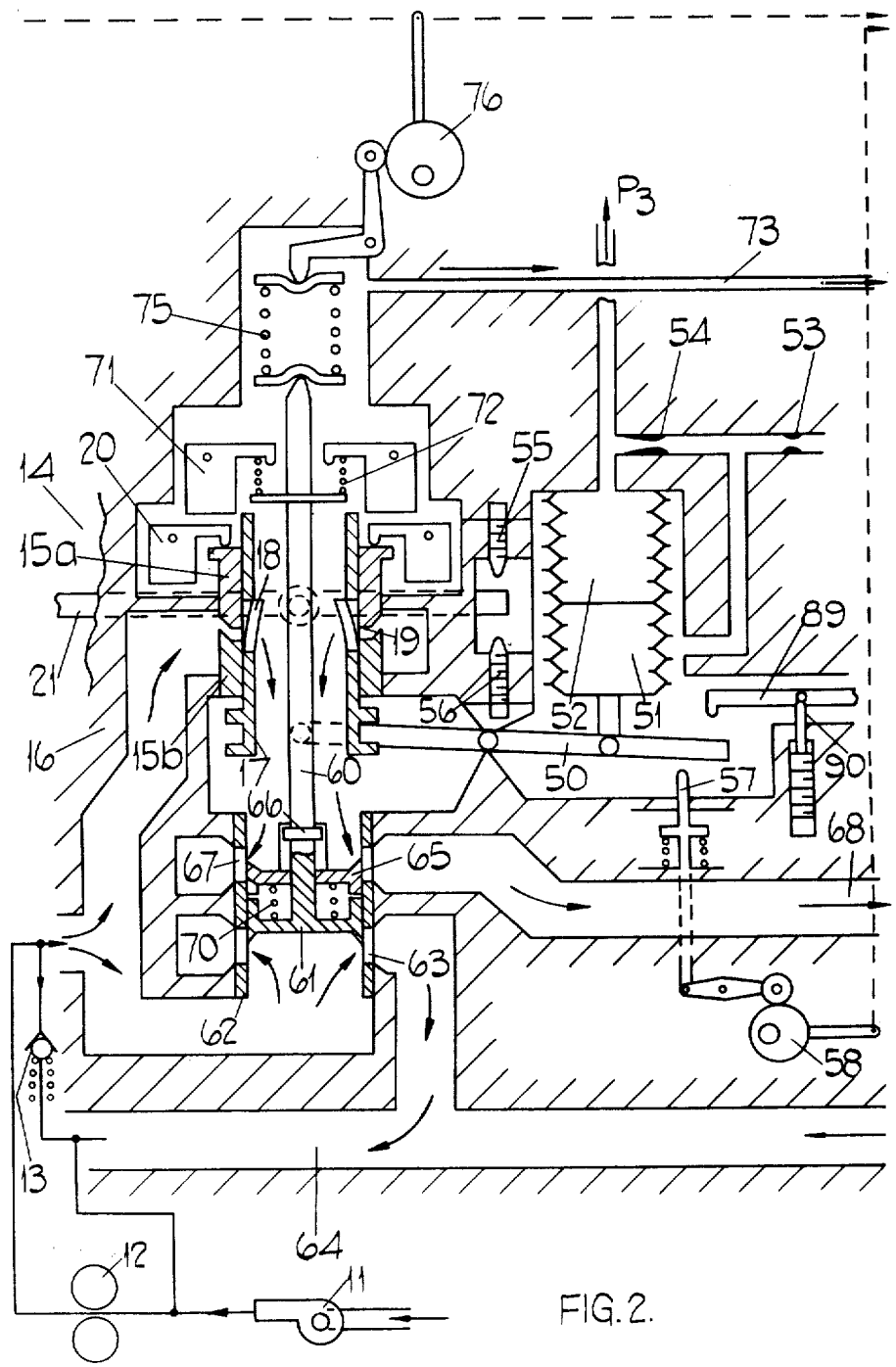
Figure 3:
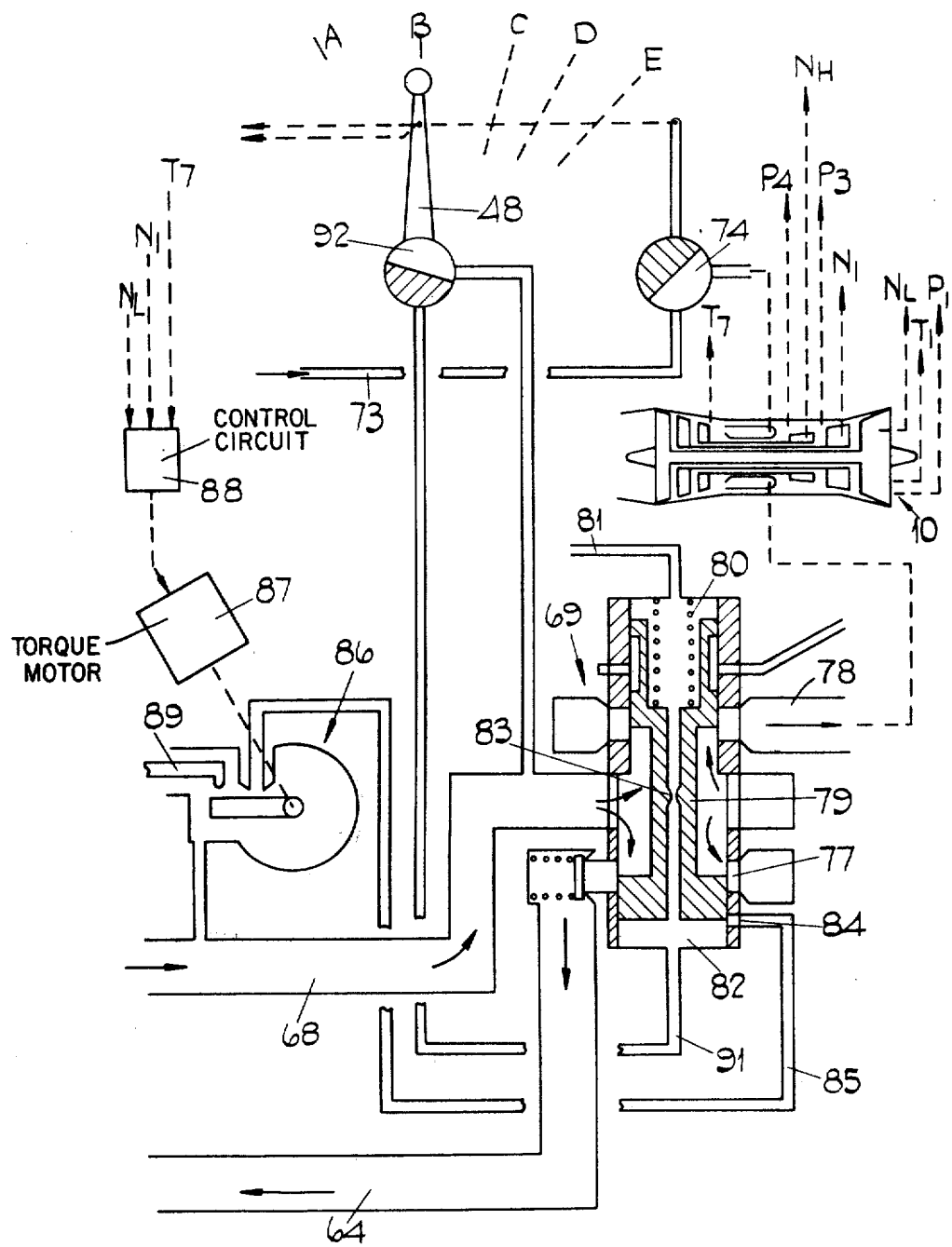

An example of the invention will now be described with reference to the accompanying drawings, in which FIGS. 1 to 3 show diagrammatically the several parts of a fuel control system. These figures should be read in conjunction with one another.

The drawings show a fuel control arrangement for a three-spool gas turbine engine 10, that is, an engine having three compressors and three associated turbines being carried on concentric shafts.

A centrifugal pump 11 supplies fuel to a positive-displacement pump 12 driven by the engine 10. A spring-loaded pressure relief valve 13 is connected across the pump 12.

Downstream of pump 12 is a variable metering arrangement 14 which comprises a sleeve 15a slidable in a body 16 relative to a fixed sleeve 15b. Slidable within sleeves 15a, 15b is a further sleeve 17. Sleeve 17 has triangular ports 18 which can more relative to a gap 19 defined between sleeves 15a, 15b to provide a variable metering orifice.

Sleeve 15a is movable in a direction relative to sleeve 17, to reduce fuel flow by a flyweight arrangement 20 driven by the high speed shaft of engine 10. Engaged with sleeve 15a is a lever 21, which, as shown in FIG. 1, is mounted for movement about a fixed axis 22 and has an arm 23 formed on one edge with a cam surface 24. A cam element 25 has a pair of cam faces 26, 27 which are formed along opposite sides of element 25. A pair of support rollers 28, 29 engage the cam face 27 and the positions of rollers 28, 29 are adjustable by threaded stems.

A transmission device 30 comprises a carrier 31 upon which a pair of arms 32, 33 are pivotally mounted. Bearing rollers 34, 35 on the ends of respective arms 32, 33 engage cam surfaces 24 and 26. Rollers 34, 35 are biased outwardly against the respective cam surfaces by a spring 36, the arrangement being such that spring 36 acts, through lever 21 to bias sleeve 15 against movement by flyweight arrangement 20.

Carrier 31 is mounted for pivotal movement about a fixed axis between the cam surfaces 24, 26 so that movement of the force of spring 36 about pivot 22, and thus the bias applied to sleeve 15a, is variable. Carrier 31 is movable by a cam 37 which is in turn responsive to a lever 38 movable from a central, idle, position shown in FIG. 1, in either direction to demand forward or reverse thrust from the engine 10. Cam 37 is formed so that the power demand, for similar engine movement from the idle position, is the same for both forward and reverse thrust. It will be understood that reverse thrust is obtained from engine 10 by deflectors (not shown) operated in response to movement of lever 38.

Cam element 25 is freely pivoted on a link 39 which is in turn freely pivoted on a lever 40 movable about a fixed axis 41. Lever 40 is biased by a spring 42 towards an edge cam 43 rotated by a stepper motor 44. Motor 44 is controlled by output pulses from a control circuit 45. Circuit 45 is a digital circuit responsive to the speed $N_H$ of the high speed shaft of engine 10, to the temperature $T_1$ at the engine compressor inlet, to the Mach No. MN and altitude of an aircraft in which the engine 10 is mounted, to the exhaust temperature $T_7$ of the engine combustion chamber, to the position $\theta$ of lever 38, and also to the setting of a selector switch 46 to drive motor 44 to rotate cam 43 so as to move cam element 25 upwardly, as seen in FIG. 1. Upward movement of cam element 25 rotates the latter anticlockwise about its pivotal connection with link 39 and thus increases the bias of spring 36 on sleeve 15a, for a given position of carrier 31. Selector switch 46 is manually operable to correspond to required operating modes of an aircraft in which the engine 10 is mounted, as for example take-off, maximum climb, and maximum cruise.

In the event of failure of circuit 44 the cam 43 can be rendered ineffective by means of a further cam 47. Cam 47 is rotatable to lift lever 40 away from cam 43 by a selector lever 48 when the latter is moved to the position indicated at A in FIG. 3.

Referring to FIG. 2 the sleeve 17 of variable metering arrangement 14 is movable by a lever 50 which is coupled to a bellows arrangement having a pair of bellows units 51, 52 arranged in tandem. Unit 51 is evacuated and unit 52 is subjected internally to an intermediate pressure $P_3$ from the engine compressor. Both units 51, 52 are subjected externally to a pressure $P_{4P}$ which is derived by means of a fluid potentiometer comprising a restrictor 53 and a venturi 54 connected in series between pressure $P_3$ and a pressure $P_4$ derived from the output of the final compressor stage of the engine.

In use, therefore, variable metering arrangement 14 is responsive to an increase in pressure $P_{4P}$, or to a decrease in pressure $P_3$, to increase fuel flow. Arrangement 14 is also responsive to an increase in the speed $N_H$ of the high speed shaft of the engine to decrease fuel flow, and the sleeve 15 is biased against movement by flyweight arrangement 20, by spring 36, acting through lever 21. The bias applied by spring 36 is increased by movement of lever 38 in either direction away from its central, idling, position. Movement of sleeve 15a is limited by adjustable stops 55, 56 which effectively act to limit acceleration and deceleration respectively.

Movement of sleeve 17 in a direction to decrease fuel flow is limited by a stop 57. Stop 57 is movable by a cam 58 rotatable by selector lever 48. Stop 57 is movable between a first position, shown in FIG. 2 and selected by a position B of lever 48, and a second position selected by positions C or D of lever 48. Position B of lever 48 corresponds to normal running of the engine 10, and positions C and D to "fuel rich" and "fuel lean" engine starting conditions respectively. Stop 57 provides, for a given engine speed as manifested by the position of sleeve 15, a minimum fuel flow through the metering arrangement 14.

Extending axially through sleeve 17 is a stem 60 which terminates in a piston element 61 slidable in a ported sleeve 62. The ends of sleeve 62 communicate respectively with the upstream and downstream sides of variable metering arrangement 14. Sleeve 62 has ports 63 which communicate via a passage 64 with the upstream side of pump 12. Element 61 thus provides a spill valve for metering arrangement 14.

Slidable on stem 60 adjacent piston element 61 is a further piston element 65. Sliding movement of element 65 is restricted in both directions by a projection 66 on stem 60. Element 65 co-operates with further ports 67 in sleeve 62 to define a throttle valve in series with metering arrangement 14. Ports 67 communicate via a passage 68 with a further valve arrangement 69, later to be described. Element 65 is urged in a direction to uncover ports 67 by the pressure downstream of metering arrangement 14, and in the opposite direction by a spring 70 which also engages piston element 61. Piston element 65 has a relieved portion 65a so that the space between elements 61, 65 is always subjected to the pressure in passage 68.

Stem 60 is engaged by a further set of governor flyweights 71 which are also driven at the speed $N_H$ of the engine high speed shaft. Flyweights 71 are biased by a spring 72 against movement in response to an increase in speed $N_H$. Spring 72 thus sets a minimum force on stem 60 and, by urging the latter towards a position in which spill valve element 61 is closed, also sets, a minimum pressure drop across the variable metering arrangement 14. An adequate flow level at light-up is thus provided. This light-up flow level is responsive to altitude by virtue of movement of sleeve 17 by bellows 51, 52.

The downstream side of metering arrangement 14 communicates via a passage 73 and a shut-off cock 74 with pilot burners of the engine 10. Cock 74 is operated by selector 48 so as to be open in all positions of lever 48 except E, which position corresponds to engine shut-down.

Piston element 61 is biased against the delivery pressure of pump 12, and in a direction to reduce spill flow and permit element 65 to open the throttle valve, by a spring 75. The force exerted by spring 75 is variable by a cam 76 which is rotatable by selector lever 48 so that in position C of lever 48 (corresponding to fuel-rich starting) the spring force is increased and the spill flow reduced.

During starting, the pressure downstream of metering arrangement is low, and spring 70 overcomes this pressure to urge piston element 65 to shut the throttle valve. Substantially the whole of the fuel delivered by pump 12 is thus supplied via passage 73 to the engine pilot burners. At low levels of fuel flow through metering arrangement 14, the throttle valve thus acts as a pressurising valve to maintain the pressure in passage 73 above that in passage 68 by an amount which does not fall below a minimum value set by spring 70.

When engine speed rises to the level at which flyweights 71 overcome spring 72, the fuel flow through arrangement 14 increases and the fuel delivery of pump 12 also increases. The pressures upstream and downstream of metering arrangement 14 increase. The downstream pressure overcomes the force exerted by spring 70 and element 61 engages element 65. These elements substantially move as a unit and are responsive to the difference in pressures across metering arrangement 14. Elements 61, 65 are also responsive, via flyweights 71, to the speed $N_H$ of the engine. In these conditions, therefore, elements 61, 65 act to maintain the pressure difference across metering arrangement 14 substantially constant for any given speed $N_H$.

The valve 69 (FIG. 3) between passages 68 and the engine main burners has a pair of outlets 77, 78 which communicate respectively with passage 64 and with the main burners. A spool control element 79 is movable so as to divide the flow from passage 68 between outlets 77, 78. Element 79 is responsive to the pressure in passage 68 and is formed with lands of different diameters so as to be biased, by the pressure in passage 68, in a direction to increase flow through outlet 77 and decrease flow through outlet 78. Element 79 is also biased in the same direction by a spring 80 and by a high pressure signal applied via a line 81 from the outlet of pump 12. Element 79 is urged in the opposite direction by a servo pressure signal in a chamber 82, derived from the pressure in line 81 via a restrictor 83. Chamber 82 communicates via a port 84, a passage 85 and a pilot valve arrangement 86 with passage 68. Port 84 is placed so as to form a valve, in co-operation with the larger end of spool element 79. A condition thus can exist in which, with port 84 partly shut, the forces on element 79 are in equilibrium. In this equilibrium condition port 78 remains at least partly open, so that the main burners are not extinguished.

Pilot valve 86 is operated by a torque motor 87 responsive to an electronic control circuit 88. Circuit 88 receives signals dependent on the speeds $N_L$, $N_I$ of the low-speed and intermediate-speed engine shafts and also on temperature $T_7$, so that an increase beyond predetermined levels of these values opens pilot valve 86 to reduce the servo pressure in chamber 82 and thereby reduce fuel flow to the engine main burners.

A lever 89 has an adjustably-positioned pivot 90 and is engageable both with the control element of pilot valve 86 and also with the lever 50 of the variable metering arrangement 14 when the lever 50 has been moved by more than a predetermined amount in response to pressures $P_3$ and $P_{4P}$. Lever 89 thus acts to reduce fuel flow to the engine in order to limit the difference between pressures $P_3$ and $P_{4P}$, and hence to determine a maximum compressor delivery pressure.

Chamber 82 of valve 69 also communicates via a passage 91 and a shut-off cock 92 with passage 68. Shut-off cock 92 is operated by selector lever 48 so as to be opened only when the latter is in position E, i.e. when the engine is shut down. With cock 92 open, servo pressure in chamber 82 falls to cause outlet 78 to be shut off completely and all fuel flow to valve 69 to be returned to the upstream side of pump 12.

I claim:

1. A fuel control system for a gas turbine engine, comprising a variable metering arrangement including a flow control element which is movable in response to engine operating parameters to control fuel flow to the engine, a stop co-acting with said control element to limit movement thereof in a direction to reduce fuel flow, said stop being movable between first and second limiting positions, and a manually operable selector device for moving said stop to said first position for normal running of the engine and to said second position for engine starting, said second position corresponding to a smaller minimum flow through said metering arrangement than said first position.

2. A system as claimed in claim 1 in which said selector device comprises a cam co-acting with said stop and movable to urge the latter to said first and second positions.

3. A system as claimed in claim 1 in which said control element comprises a sleeve movable in response to an increase in the delivery pressure of a compressor of the engine to increase fuel flow.

4. A system as claimed in claim 1 which includes a shut-off valve downstream of said metering arrangement, said selector device being operable in one of its positions to shut said shut-off valve, and in two others of its positions to move said stop to its first and second positions respectively.

* * * * *